Patented Oct. 27, 1931

1,829,222

UNITED STATES PATENT OFFICE

WILLIAM B. JUPP, OF NEW YORK, N. Y., AND FRANK E. QUEENEY, OF TEANECK, NEW JERSEY, ASSIGNORS TO INTERNATIONAL MOTOR COMPANY, OF NEW YORK, N. Y., A CORPORATION OF DELAWARE

MANUAL CONTROL OF ELECTRIC TRANSMISSIONS FOR GAS ELECTRIC DRIVES

Application filed August 29, 1927. Serial No. 216,126.

The present invention relates in general to vehicles having a transmission, or drive, of the gas-electric type, where an internal combustion engine in the vehicle is used as a source of power to drive an electric generator, which, in turn, supplies power to suitable driving motors. In order that the most efficient operation be obtained, it is necessary to provide both electrical and mechanical means to vary the speed or power output of the units and the present invention deals with suitable controls to effect such variations.

An object of the invention is to provide a control for the engine, electric generator and motors which is operated manually, the control members being similar in number, character and position to those of a steam locomotive. This eliminates the necessity of changing the common practice and enables an engineer of one type of vehicle to operate the other type quite readily.

A further object of the invention is to provide a manual control for the above units which, by progressive steps, automatically effects certain desired changes in the mechanism to bring the engine from a dead condition through idle running and charging, through the successive changes of carbureter control and field resistance of the motors to a full speed in either ahead or reverse directions.

More specifically, an object of this invention is to provide a manual control which provides a plurality of control positions, the first of them being an "off" position in which the engine is dead and all of the units inoperative, the magneto circuit being grounded. A second control position is designed to connect the 32 volt battery across the generator to operate it as a motor to start the engine, the latter then overrunning the machine to drive it as a generator and in this idle condition, charge the battery. The third control position cuts in the shunt field of the generator and disconnects the series field leaving in a tickler field winding and giving a differentially compounded generator. The main line switch to the driving motors is closed simultaneously and a first throttle position is effected through a suitable circuit which is closed with the above operations of this control position.

A fourth control position closes a circuit to move the engine throttle to a second position and a unit of resistance is cut out of the shunt field of the main generator.

With each of the above steps, the acceleration of the car is increased and subsequent steps are added to effect the desired number of changes of speed by cutting out more resistance in the shunt field of the generator as well as moving the throttle to a third position. After all of the resistance is cut out of the field circuit, an added circuit is closed to hold the resistance short circuited so that the controller may be moved back to change the throttle positions without affecting the electrical circuits so that the engine will be prevented from racing when descending a grade.

Further objects and advantages of the present invention will be apparent upon a more detailed study of the mechanism thereof and reference will now be had to the accompanying drawings for a description thereof wherein.

At the outset it should be noted that there are three main conditions of operation upon which the entire system is based, and to enable the invention to be more fully understood, these conditions will be described with reference to Figures 3 and 4 of the drawings before the complete system, by which each change is effected, is gone into.

Figure 3:
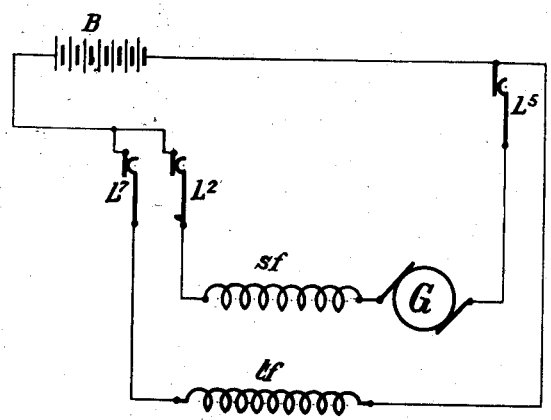
Figure 3 is a diagram, greatly simplified, wherein only sufficient elements are shown to illustrate the first main condition of operation.

The first main condition of operation is illustrated in Figure 3 wherein G represents a generator having a series field $sf$ and a teaser field $tf$, B designates a 32 volt storage battery of the type used in service of this character, and $L^7$, $L^2$ and $L^5$ indicate suitable switches for the teaser field, series field and armature, respectively. When these switches are closed, the battery impresses 32 volts across the generator and drives it as a motor. This serves to start the engine which then overruns the motor and drives it as a generator to charge the battery. This is the idling position of the controller handle and no movement of the car takes place in this main operating condition.

Figure 4:
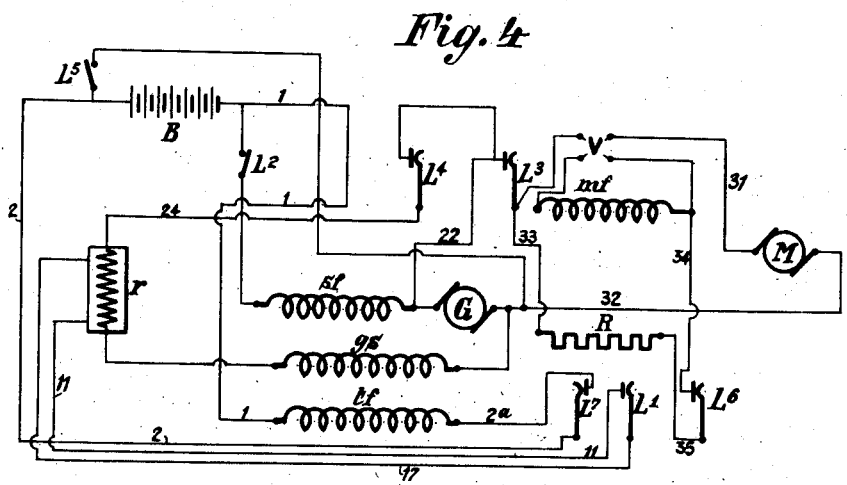
Figure 4 is a diagram, greatly simplified, wherein only sufficient elements are shown to illustrate the second and third main conditions of operation.

The second main operating condition is illustrated in the diagram of Figure 4, wherein G, $gs$, $sf$, and B designate the generator, shunt field, series field, and battery, respectiley, $tf$ the tickler field, $r$ the shunt field resistance, $L^7$ a con act in the circuit $2^a$, 2 of the tickler field, and $L'$ a contact in the circuit 11, 17 to short circuit the resistance $r$. Contacts $L^4$, $L^3$, and V are operated from the main controller drum, contact $L^4$ being in the shunt field circuit 24, contact $L^3$ connecting the motor to the generator through line 22 and the series field $mf$ of the motor, and contact V connecting, reversibly, the motor armature M to the series field $mf$. Resistance R is designed to be cut across the field $mf$ to weaken it and cause an increase of speed of the motor M, contact $L^6$ serving to perfect such circuit through wires 33, 35 and 34. Contacts $L^7$ $L'$ and $L^6$ are tied together so that when the former is opened, the latter are closed, and vice versa, when the latter are open, the former is closed. With contacts $L^4$, $L^3$ and V closed and $L^7$ closed, the motor circuit is closed and the car is running at slow speed, the tickler field $tf$ being cut in by $L^7$ and the shunt field resistance being in, since $L'$ is open. This corresponds to the first running condition and is the second main operating condition.

From this condition, steps of resistance are cut out progressively in the shunt field and successive throttle positions are effected to increase the speed until a full speed condition is reached.

The third main operating condition is illustrated in the diagram of Figure 4 except that the contacts $L^7$, $L'$ and $L^6$ are operated to open the former and close the latter, resulting in cutting out the tickler field and short circuiting the resistance $r$ through contact $L'$. Closing contact $L^6$ shunts the motor field $mf$ with the resistance R, thus weakening the field and increasing the speed of the motor.

Having set forth the three primary operating conditions the invention will now be set forth in detail to describe the manner in which the units are connected to enable each successive step to be effected.

Apparatus

Before describing the circuit connections of the system in detail a brief description of the apparatus used is as follows. M. D. designates the main controller drum which is manually operated and serves to energize all main circuits, control the throttle operation, control the actuation of the reset switch and cut in or out certain resistance elements in the generator shunt field circuit.

The reverse drum is indicated at R. D. and controls the actuation of the reverse switch to reverse the motor fields. In addition, other elements of the generator shunt field resistance are controlled by this drum.

R. S. designates the reset switch which is provided to release the latch on an over voltage relay operated by an excess generator voltage to break the generator circuit. In order that the reset switch be effective the main drum must be moved to idle position and in this manner the operator is prevented from cutting in the generator when the voltage is too high without starting the accelerating action over again.

The battery is indicated at B and is connected by fuses B. S. to energize the teaser field circuit, the light circuit, and to be charged upon proper operation of the controls.

Figure 1:
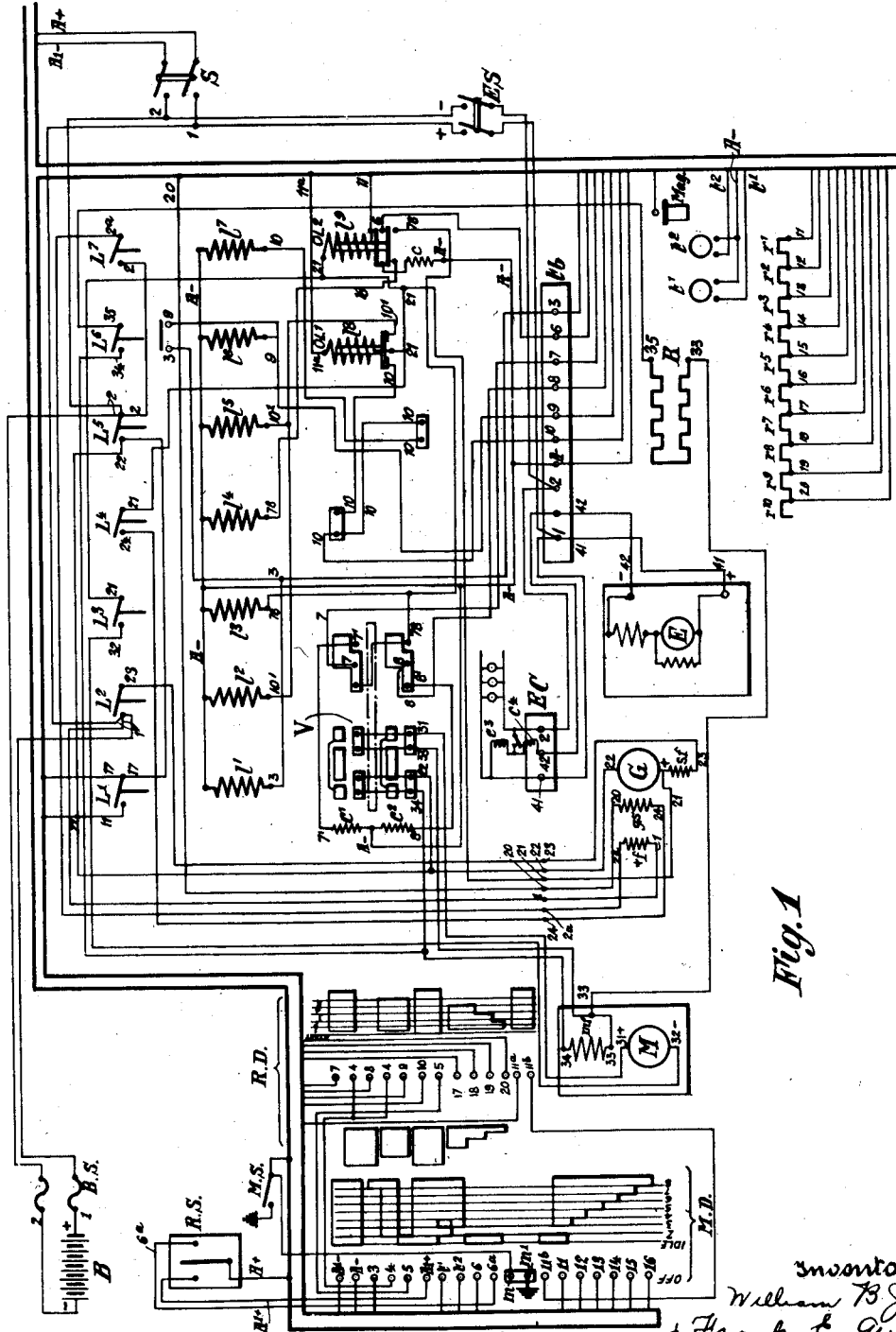
Figure 1 is a diagram showing the electrical circuits and connections by which the car is started and brought up to full running speed in either ahead or reverse directions.
Figure 2:
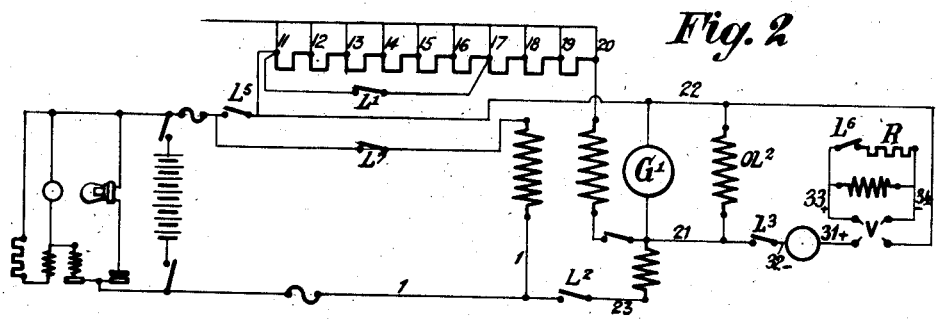
Figure 2 is a schematic power circuit of the connections shown in Figure 1.

The magneto is represented at the right in Figure 1 and is controlled by switch M S and the contact on the main drum which grounds the magneto when the drum is in the "off" position. $t^r$, $t^2$ indicate the throttle magnets which are controlled by suitable contacts on the main drum to move individually or simultaneously to give three adjustments of the throttle.

The main driving motor is indicated at M, having a field resistance R controlled by suitable relays and a reverser V.

G indicates the main generator which is driven by an internal combustion engine and controlled by suitable relays and the control drums. Resistance elements $r'$, $r^2$ etc. are adapted to be cut in or out of the generator field circuit and provide the desired variations in operation.

A lighting and charging generator E provides current for appropriate circuits and is connected to be cut in or out according to its voltage. This mechanism is designated by the reference character E C and serves as a control for the lighting generator. The lighting generator is connected to the battery by means of switch E. S. and switch S serves, when closed, to connect the battery with the control system.

Relays $L'$, $L^2$—$L^7$ and overload relays O $L'$ and O $L^2$ serve to connect the machines in proper order and effect the desired sequential operation.

Circuit connections

The positive terminal of the battery is connected to one terminal of relay $L^2$ by wire 1—1 and the negative terminal to a terminal of relay $L^5$ by wire 2—2. Fuses B. S. are inserted in these wires to control the operation thereof. From these relay contacts the same wires are extended to switch S which connects the positive wire 1—1 to the A+ line wire leading to the center contact of reset switch R. S., and the negative wire 2—2 to the A1— line wire leading to the A1— contact on the main drum. The positive wire 1—1 is further extended to connect one terminal of the teaser field $tf$ to the positive terminal of the battery. The teaser field circuit is completed by wire $2^a$—$2^a$ which connects the other field terminal with one contact of relay $L^7$, the other contact of which is connected to the negative terminal of the battery by an extension of wire 2—2. The positive and negative wires are extended to terminal board $tb$ and to the control mechanism E. C., the positive terminal of the lighting generator E being connected to the positive wire 1 to charge the battery properly. Switch E. S. is inserted in the circuit to disconnect the unit when desired. When the exciter voltage is at a desired value the coil $c^3$ closes the switch shown in the diagrammatical illustration to put the exciter across the lighting and charging circuits. Reverse current coil $c^4$ cuts out the generator in case of a reversal of current to protect the system.

A suitable magneto MAG. is connected to a control switch M. S. and to contact $m$ on the main drum M. D., an adjacent contact $m'$ being grounded so that in the "off" position of the main drum the contacts will be bridged to ground the magneto. The engine throttle is operated by two magnets $t'$, $t^2$ which are connected through wires $t'$ and $t^2$ to the proper contacts $t'$ and $t^2$ on the main drum. In the idle position of the main drum, these contacts are not engaged but as the drum is stepped around they are individually and then simultaneously engaged to give the desired throttle control.

Terminal A1+ of reset switch R. S. is connected to contact A1+ on the main drum and terminal $6^a$ to the corresponding contact on the drum. Contact 6 on the drum is connected through wire 6 to terminal board $tb$ and front contact 6 of over voltage relay O $L^2$. The other front contact is connected to coil $c$ which is connected to the negative line wire A—. When the relay O $L^2$ has been actuated due to excess generator voltage it is latched in such position, its front contacts then being closed to connect coil $c$ with terminal $6^a$ of the reset switch. This coil, when energized, releases the latch and permits the overload relay to drop back and close the back contacts thereof. It will therefore be apparent that the main drum must be moved to the "idle" position before the closing of reset switch R. S. will effect the energization of coil $c$ to release the relay. This prevents the generator from being cut in again until the controller drum is in the idle position and safeguards the system for injury.

Terminal A— on the main drum is connected to the negative line wire A— and, when the main drum is moved from the "off" position is energized from contact A1—.

Contact 3 on the main drum is connected to terminal board $tb$ and through line 3 to the coil $l'$ of relay $L'$, the other side of the coil being connected to the negative line A—. This relay $L'$ connects wires 11 and 17 to cut out the corresponding elements of resistance in the generator field, so that after such elements have been progressively cut out by the drum, the contact 3 is engaged by the drum to hold them out. In order that the drum may be moved back without cutting in such elements, relay $L^6$ (controlling the resistance in the motor field as described later) is provided with switch contacts 3 and 9, the former being connected to line 3 and the latter through line 9 and terminal board $tb$ to contact 9 on the reverse drum. When this drum is moved to operating positions 1, 2, 3 and 4, contact 9 is engaged and connected with a contact 4 which is connected through wire 4 with contact 4 on the main drum. In this manner coil $l'$ is energized from contact A1+, through contact 4, line 4, reverse drum contacts 4 and 9, line 9, contacts 9 and 3 and line 3 and the resistance elements are held out until the main drum is moved back to idle position.

Contact 5 on the main drum energizes the teaser field winding when both drums are moved to "idle" and "start" positions, respectively, through contacts 5 and 5 on the respective drums, contact 10 on the reverse drum, wire 10 and terminal board $tb$, to coil $l^7$ of relay $L^7$, the other side of which coil is connected to the negative line wire A—. This coil, when energized, connects wire 2 with wire $2^a$, teaser field winding $tf$ being connected to the latter and positive wire.

Overvoltage relay O $L'$ serves to connect the generator across the lighting and charging circuits when it is idling at 300 R. P. M. so that it may charge the battery at such low speed. Wire 11, being connected to wire 22 (the negative side of the generator), contact 11 connected with 11$b$ on the main drum, contact 11$b$ on R. D. connected to 11$b$ on M. D. and 11$a$ on R. D., it will be seen that the coil $l^8$ is placed across the generator through wire 11$a$ and wire 21. By means of these connections, the main drum may be moved to "idle" position so that the engine can be run and the throttle manipulated manually without connecting the generator across the line, since the reverse drum is in "off" position.

This prevents the generator being cut in when its voltage is excessive due to the manipulation of the throttle when the vehicle is not moving. At higher speeds, and when the vehicle is in motion, the contact 11a is no longer engaged by the drum contact and the relay O L' drops out to prevent injury due to higher voltage. Coil $l^8$ is connected by wire 11a to contact 11a on the reverse drum and by wire 21 to the positive terminal of the generator. The contacts of relay O L' are connected through wire 10 to contact 10 on the reverse drum R. D., contact 5 and wire 5 with A1+, and through wire 10' with coils $l^2$ and $l^5$, the other terminals of which are connected to the negative line wire A—.

Contacts 11, 12, 13, 14, 15 and 16 on the main drum are connected through their respective wires to elements of resistance $r'$, $r^2$, $r^3$, $r^4$, $r^5$, $r^6$, respectively, and as the drum is moved the elements will be cut out successively.

On the reverse drum R. D., contact 7 is connected through wire 7 with terminal board $t\ b$ and contact 7 on the reverser V. Likewise, contact 8 is connected through wire 8 with contact 8 on the reverser. Wire 78 is adapted to be connected to either contact 7 or 8 on the reverser and is connected to coil $l^3$ and through the back contacts of over-voltage relay O L² to coil $l^4$ the other side of which coils are connected to negative line wire A—. Wire 7' is connected to coil $c'$ and wire 8' to coil $c^2$, these coils also being connected to the negative line wire A—. When the reverse drum R. D. is moved in either a forward or reverse direction one of the coils $c'$ or $c^2$ will be energized, and if the reverser is not in the proper position, the energized coil will move it to such position. The connections are such that upon movement of R. D. in a forward direction, the proper coil $c'$ or $c^2$ will be energized to move the reverser to connect the motor for driving forward and to connect the other coil so that, upon movement of R. D. a reversing direction, it will be energized.

Contacts 17, 18, 19 and 20 on reverse drum R. D. are connected to their respective resistance elements $r^7$, $r^8$, $r^9$ and $r^{10}$.

The positive terminal of the generator is connected through wire 21 with coils $l^8$ and $l^9$, the former being connected with wire 11a and the latter with wire 11. From $l^8$ wire 21 extends to relay L⁴ and from $l^9$ to relay L³. The negative terminal of the generator is connected through wire 22 to contact 22 of the reverser V, wire 11 and contact 22 of relay L⁵.

The generator shunt field $gs$ is connected through wire 24 with contact 24 of relay L⁴ and through wire 20 to the line wire 20.

The positive terminal of the motor is connected through line 31 with contact 31 on the reverser V and the negative terminal to contact 32 of relay L³ by line 32. One terminal of the motor field is connected through wire 33 with contact 33 on the reverser and with resistance R. This resistance is then connected to relay L⁶ by wire 35. The other terminal of motor field $m\ f$ is connected through wire 34 with the reverser V and contact 34 of relay L⁶.

The lighting generator is connected to terminal board $t\ b$ by positive and negative wires 41 and 42, respectively, the same connected to the controller E. C.

Operation

The first step in the operation is to move the main drum to "idle" position and the reverse drum to "start". This energizes all A— circuits by connecting contacts A1 — and A — on the main drum together, A1— being connected to wire 2 by switch S. Contacts A1+ and 5 are closed and since the reverse drum is in the "start" position, 5 is connected to wire 10 to energize coil $l^7$ and close relay L⁷. This closes the teaser field circuit through wire $2^a$ and the generator is excited to produce a 32 volt charging potential and to turn over as a motor to start the engine. The ground having been removed through contact $m$, the engine is started and runs at an idling speed of 300 R. P. M. to drive the generator to give the necessary charging voltage. Contacts 11b and 11 on the main drum and 11b, 11a on the reverse drum, being closed, the coil $l^8$ is placed across the generator through wire 21 and wire 11a, contacts 11a, 11b on the reverse drum, contact 11b and 11 on the main drum, and 22. This connects wire 10 through wire 10' with coils $l^2$ and $l^5$ to close relays L² and L⁵ to connect the generator across the lighting and charging circuit 1 and 2 from wires 23 and 22. It will thus be seen that G is connected as a 32 volt compound motor to start the engine and then will be driven as a 32 volt differential generator to charge the battery. If its voltage rises beyond a predetermined value the over-voltage relay O L' will operate to break the circuit 10—10'. In this condition contacts 6 and 6a are also closed to connect the reset switch R. S. (when moved to the right) with the A+ line wire and wire 6 to the front contacts of relay O L². When this relay is energized due to excess generator voltage, it is latched in such position and can be released only by the energization of coil $c$. As reset switch is normally moved to the left, the circuit to this coil is normally broken and can only be closed when the controller has been moved to the "idle" position and the reset switch moved to the right. In this manner injury to the system is prevented since the generator cannot be cut in again until the system is cleared.

The next step in the operation is to move the reverse drum to position 5 and the main drum to position 2. Contacts 7 and 4 are closed to move the reverser V to the proper position through main drum contacts A1+ and 4, reverse drum contacts 4 and 7, wire 7 and coil to negative line wire A—. (If R. D. is moved to reverse the direction of movement, contacts 4 and 8 are closed to give the corresponding reversal of motor field by movement of the reverser field). Contacts 5 and A1+ are broken on the main drum to cause relays $L^2$ and $L^5$ to drop out, thus disconnecting the generator from the battery circuit. A1+ is connected to $t'$ to energize the first throttle magnet to speed up the engine. Current also flows from wire 7 or 8 (depending upon position of R. D.) through wire 78 to energize coil $l^3$ and close relay $L^3$. This connects the motor to the generator and the vehicle starts under slow speed condition. Contacts 6 and 6a and contacts 11b and 11 on the main drum are broken to prevent the reset switch from energizing coil c and over-voltage relay O L' from connecting the generator across the battery circuit.

The third step in the operation is to move the main drum to position 3 and leave R. D. at 5. Throttle magnet $t'$ drops out and $t^2$ cuts in. Contacts 11 and 12 are closed to cut out element $r'$ of resistance to increase the field strength of the generator and increase the vehicle speed.

The fourth step in the operation is to move the main drum to position 4, leaving R. D. at 5. Both throttle magnets cut in to give the full throttle and contact 13 is closed to cut out element $r^2$ of the resistance. The greater field strength, as well as engine speed, produces a greater vehicle speed.

The fifth, sixth and seventh steps in the operation are to advance the main drum to positions 5, 6 and 7, thus cutting out resistance elements $r^4$, $r^5$ and $r^6$ and producing a gradual acceleration.

The eighth step in the operation is to move the reverse drum to position 4, leaving M. D. at 7. Contacts 4 and 9 are closed to connect A1+ with wire 9 and energizes coil $l^6$ to close relay $L^6$ and insert resistance R across the motor field through wires 33, 35, relay $L^6$ and wire 34. This weakens the motor field and causes it to speed up.

The ninth, tenth and eleventh steps in the operation are to move the reverse drum through positions 3, 2 and 1, closing contacts 17, 18, 19 and 20 to cut out, progressively, the remainder of the resistance in the generator shunt field to produce greater speed.

The twelfth step in the operation is to move the main drum to position 8, leaving R. D. at 1. Contact 3 is closed to energize wire 3 and coil $l'$ of relay $L'$. This short circuits resistance elements $r'$, $r^2$, $r^3$, $r^4$, $r^5$ and $r^6$ and sets the circuits. Since this relay was closed when relay $L^6$ closed, through wire 9, the main drum may be moved back to the throttle position without re-inserting the resistance or changing the circuits.

In order that the engine will be prevented from racing when descending a grade, the throttle position may be changed by moving the main drum to appropriate positions. As explained above, this does not affect the operating circuits, the reverse drum being left in position 1 or other desired position.

What we claim is:

1. A device of the character described comprising a power means, a generator driven thereby, driving motors driven by the generator, a battery, a plurality of fields for the generator, means to energize certain of the fields and connect the generator to function as a motor to start the power means and cause the power means to drive the generator at an idling speed to charge the battery, means to connect other of the fields to generate a higher voltage to operate the driving motors when the power source is speeded up, and means to speed up the engine to normal speed and simultaneously operate the last named means.

2. A device of the character described comprising a power means, a generator driven thereby, driving motors driven by the generator, a battery, a plurality of fields for the generator, means to energize certain of the fields and connect the generator to function as a motor to start the power means and cause the power means to drive the generator at an idling speed to charge the battery, means to connect other of the fields to generate a higher voltage to operate the driving motors when the power source is speeded up, and means to disconnect the battery upon effecting the last named connection.

3. A device of the character described comprising a power means, a generator driven thereby, driving motors driven by the generator, a battery, a plurality of fields for the generator, and means to energize certain of the fields and connect the generator to function as a motor to start the power means and cause the power means to drive the generator at an idling speed to charge the battery, means to connect other of the fields to generate a higher voltage to operate the driving motors when the power source is speeded up, means to speed up the engine to normal speed and simultaneously operate the last named means, and means to disconnect the battery upon effecting the last named connection.

4. A device of the character described comprising an internal combustion engine having a throttle, a generator driven thereby and having generator field connections, control means to connect the generator to start the engine and then be driven by the engine to generate current, and means operated by the last named means to vary progressively, the throttle setting of the engine predetermined amounts and simultaneously vary the generator field connections to increase the output thereof.

5. A device of the character described comprising an internal combustion engine, a generator driven thereby, an electric circuit, a driving circuit, means, including the generator and the electric circuit for supplying power to the latter at a low voltage when the engine is running at idling speed, and means to supply power to the driving circuit at a higher voltage when the engine is speeded up.

6. A device of the character described comprising an internal combustion engine, a generator driven thereby, an electric circuit, a driving circuit, means, including the generator and the electric circuit for supplying power to the latter at a low voltage when the engine is running at idling speed, and means to disconnect the generator from the electric circuit and simultaneously speed up the engine.

7. A device of the character described comprising an internal combustion engine, a generator driven thereby, an electric circuit, a driving circuit, means, including the generator and the electric circuit for supplying power thereto to the latter at a low voltage when the engine is running at idling speed, and means simultaneously to disconnect the generator from the electric circuit, connect it to the power circuit and speed up the engine.

8. A device of the character described comprising an internal combustion engine, a generator driven thereby, a teaser field coil on the generator, a second field coil thereon, an electric circuit, means to connect the teaser field and generator to the electric circuit to start the engine and then be driven thereby at idling speed to supply current to the circuit, a driving circuit, and means simultaneously to disconnect the generator and teaser field from the first circuit, connect it with the second coil to supply current to the power circuit and speed up the engine.

9. A device of the character described comprising, a power source, a generator driven thereby, a driving circuit connected to the generator, means to vary the power delivered to the driving circuit from zero to maximum, means to disconnect the generator from the circuit upon a predetermined excess voltage thereof, and means operable when the power varying means is at zero position to reset the disconnecting means.

10. A device of the character described comprising, a power source, a generator driven thereby, a driving circuit connected to the generator, means to vary the power delivered to the driving circuit from zero to maximum, means to disconnect the generator from the circuit upon a predetermined excess voltage thereof, means to hold the disconnecting means in such position, and means operable only when the power varying means is at zero position to release the holding means.

11. A device of the character described comprising an internal combustion engine, a generator driven thereby, an auxiliary electric circuit, means driven with the generator for supplying power to the circuit at a predetermined voltage, said means being effective to supply such voltage when the engine is operating at running speed, means to drive the generator and auxiliary means at the idling speed of the engine, means to connect the generator to the circuit at such speed to supply current at the predetermined voltage thereto, and means automatically to disconnect the generator from the circuit and connect the auxiliary means thereto as the speed of the engine is increased from the idling condition.

12. A device of the character described comprising a power source, a generator driven thereby, a driving motor, means to connect the driving motor to the generator, control means to vary the current supply to the motor and to cause it to be run in either direction, means operated by the control means to connect the motor to be driven in either direction, and means operable, when the control means is moved for one direction of rotation of the motor to cause the second mentioned means to be connected to effect reverse rotation of the motor when the control means is later moved to cause such rotation.

13. A device of the character described comprising an internal combustion engine having a throttle, a generator driven thereby, a field circuit for the generator, means to connect the generator to start the engine and then be driven by the engine to generate current, a resistance, means to insert the resistance in the field circuit of the generator, a driving motor, means to control the driving motor operated by the generator, means to cut out, progressively, the resistance in the generator field circuit, and means operated with the motor operating means to vary the throttle setting of the engine.

14. A device of the character described comprising an internal combustion engine having a throttle, a generator driven thereby, a field circuit for the generator, means to connect the generator to start the engine and then be driven by the engine to generate current, a resistance, means to insert the resistance in the field circuit of the generator, a driving motor, means to control the driving motor operated by the generator, means operated with the last named means to vary the throttle setting of the engine to bring it up to normal speed, and means to cut out, progressively, the resistance in the generator field circuit after the engine has been brought up to speed.

15. A device of the character described comprising an internal combustion engine having a throttle, a generator driven thereby, a field circuit for the generator, means to connect the generator to start the engine and then be driven by the engine to generate current, a resistance, means to insert the resistance in the field circuit of the generator, a driving motor, means to control the driving motor operated by the generator, means operated with the last named means to vary the throttle setting of the engine to bring it up to normal speed, means to cut out, progressively, the resistance in the generator field circuit after the engine has been brought up to speed, and means to increase the throttle setting as the resistance is cut out to maintain the engine at a desired speed.

16. A device of the character described comprising an internal combustion engine having a throttle, a generator driven thereby, a field circuit for the generator, means to connect the generator to start the engine and then be driven by the engine to generate current, a resistance, means to insert the resistance in the field circuit of the generator, a driving motor, means to control the driving motor operated by the generator, means operated with the last named means to vary the throttle setting of the engine to bring it up to normal speed, means to cut out, progressively, the resistance in the generator field circuit after the engine has been brought up to speed, and means to insert a resistance across the motor field as the first resistance is cut out.

17. A device of the character described comprising an internal combustion engine having a throttle, a generator driven thereby, a field circuit for the generator, means to connect the generator to start the engine and then be driven by the engine to generate current, a resistance, means to insert the resistance in the field circuit of the generator, a driving motor, means to control the driving motor operated by the generator, means operated with the last named means to vary the throttle setting of the engine to bring it up to normal speed, means to cut out, progressively, the resistance in the generator field circuit after the engine has been brought up to speed, means to increase the throttle setting as the resistance is cut out to maintain the engine at a desired speed, and means to insert a resistance across the motor field as the first resistance is cut out.

18. A device of the character described comprising an internal combustion engine having a throttle, a generator driven thereby, a field for the generator, a resistance in the field of the generator, means to vary the throttle setting of the engine, means operated with the last named means to vary the resistance in the generator field, and means to vary the throttle without varying the resistance.

19. A device of the character described comprising an internal combustion engine having a throttle, a generator driven thereby, a field for the generator, a resistance in the field of the generator, means to vary the throttle setting of the engine, means operated with the last named means to short circuit the resistance in the generator field, and means to vary the throttle while maintaining short circuited a predetermined amount of resistance.

20. A device of the character described comprising an internal combustion engine having a throttle, a generator driven thereby, a field for the generator, a resistance in the field of the generator, means to vary the throttle setting of the engine, means to vary the resistance in the generator field, means to short circuit a predetermined amount of resistance, and means to vary the throttle without affecting the resistance circuit.

21. A device of the character described comprising an internal combustion engine having a throttle, a generator driven thereby, a field for the generator, a resistance in the field of the generator, means to vary the throttle setting of the engine, means to vary the resistance in the generator field, a motor having a field, means to operate the motor from the generator, means to insert a resistance across the field thereof, means to effect a predetermined connection of the resistance circuits, and means to vary the throttle setting while maintaining the desired connections of resistance circuits.

22. A device of the character described comprising an internal combustion engine having a throttle, a generator driven thereby, a field for the generator, a resistance in the field of the generator, means to cut out, progressively, a portion of the resistance, a motor having a field, means to insert a resistance across the motor field after the predetermined portion of resistance has been cut out of the generator field, and means to cut out the remainder of the generator field resistance after the motor field resistance has been connected.

23. A device of the character described comprising an internal combustion engine having a throttle, a generator driven thereby, a field for the generator, a resistance in the field of the generator, means to cut out, progressively, a portion of the resistance, means to vary the throttle setting during the change of resistance to maintain the engine speed at a predetermined value, a motor having a field, means to insert a resistance across the motor field after the predetermined portion of resistance has been cut out of the generator field, and means to cut out the remainder of the generator field resistance after the motor field resistance has been connected.

24. A vehicle comprising an engine having a throttle for controlling the admission of motive fluid thereto, a generator driven by said engine having a motor connected thereto for propelling the vehicle, an excitation system for said generator including a variable resistor, a plurality of contactors arranged to vary the said resistor so as to control the excitation of said generator, a plurality of relays arranged to open and close said throttle, and means including a controller for simultaneously energizing said relays and said contactors so as to increase and decrease the excitation of said generator in accordance with the opening and closing of said throttle.

25. A vehicle comprising an engine having a throttle for controlling the admission of motive fluid thereto, a generator driven by said engine having a motor connected thereto for propelling the vehicle, an excitation system for said generator including a variable resistor, a plurality of contactors, arranged to vary said resistor, a plurality of relays arranged to open and close said throttle, and means including a controller for simultaneously energizing said relays and said contactors so as to increase and decrease the excitation of said generator in accordance with the opening and closing of said throttle and for varying the excitation of said generator independently of the movement of said throttle after the same has been opened a predetermined degree.

This specification signed this 26 day of August, A. D. 1927.

WILLIAM B. JUPP.
FRANK E. QUEENEY.